T. A. GERLACH.
SPRING SWITCH.
APPLICATION FILED OCT. 11, 1910.
995,341.
Patented June 13, 1911.
2 SHEETS—SHEET 1.
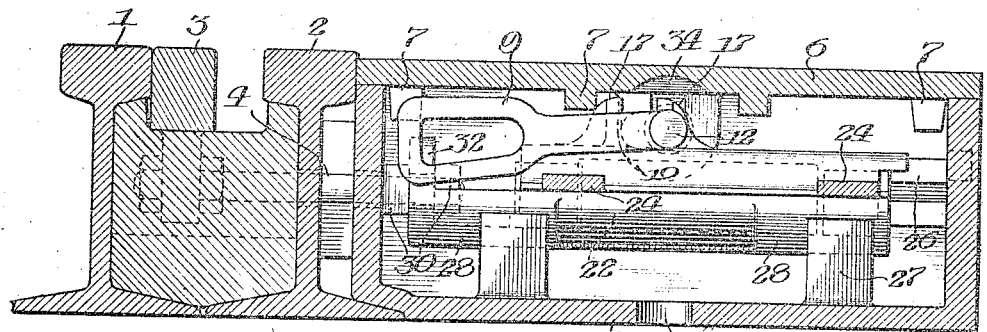
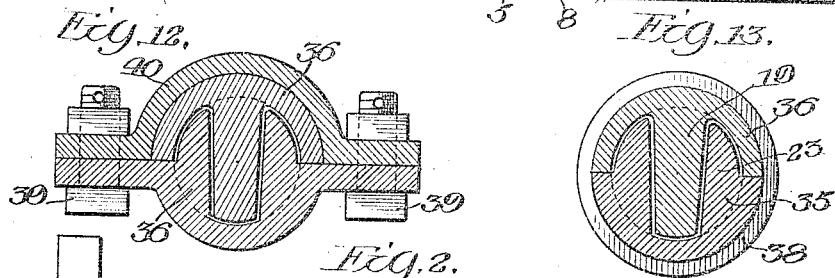
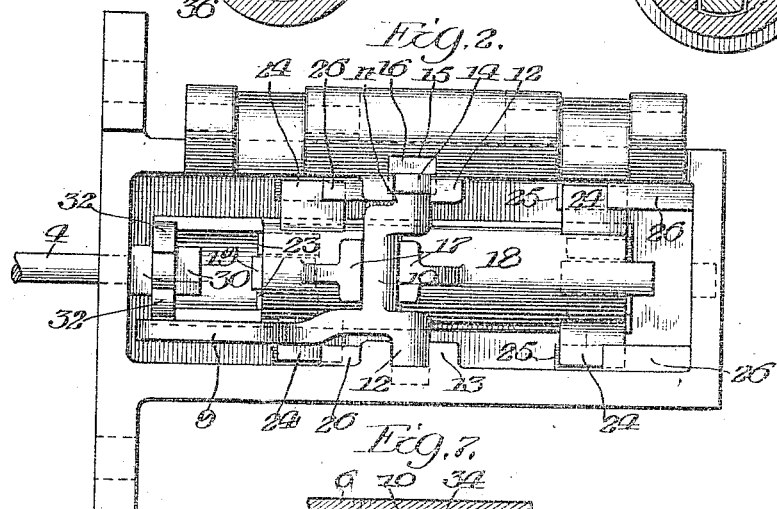
Witnesses
O. M. Wernich
A. Lyda Jones
Inventor
Thomas A. Gerlach
by Max W. Zabel
Atty

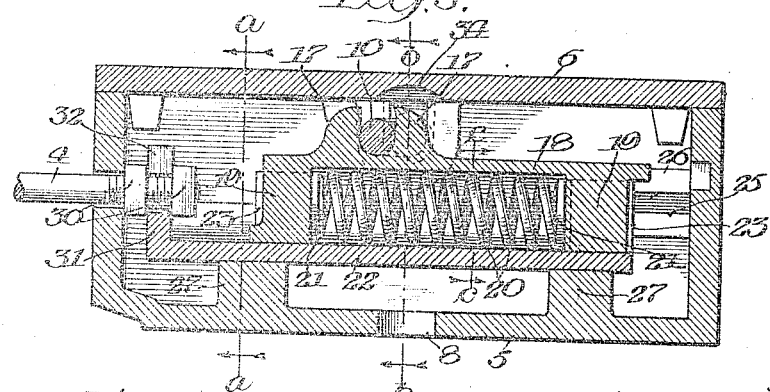
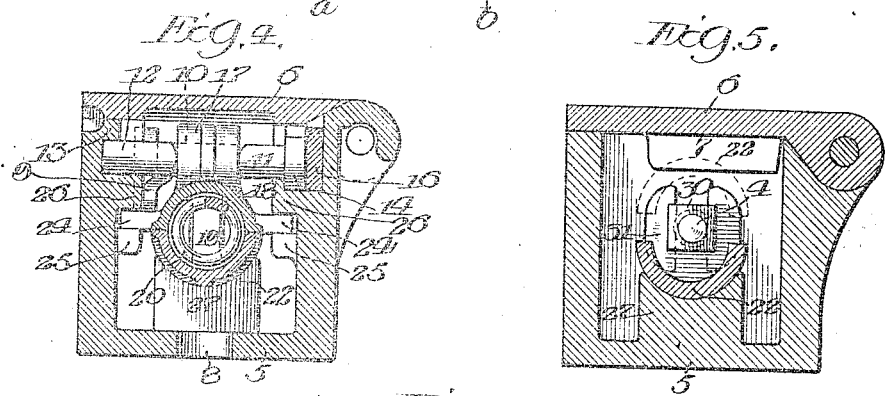
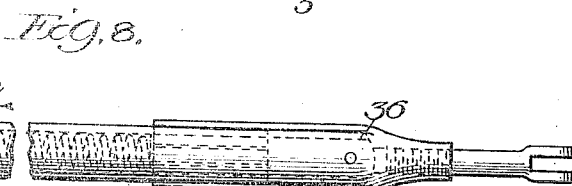
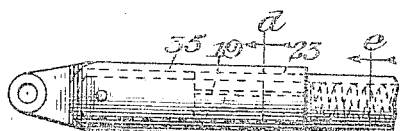
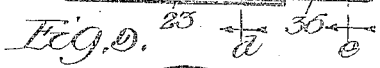
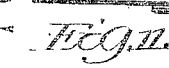
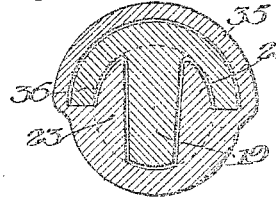
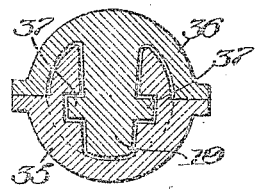
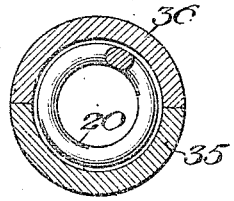
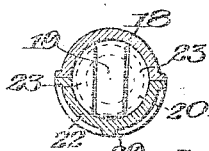

UNITED STATES PATENT OFFICE.

THOMAS A. GERLACH, OF HARVEY, ILLINOIS.

SPRING-SWITCH.

995,341. Specification of Letters Patent. Patented June 13, 1911.

Application filed October 11, 1910. Serial No. 586,539.

*To all whom it may concern:*

Be it known that I, THOMAS A. GERLACH, a citizen of the United States, residing at Harvey, in the county of Cook and State of Illinois, have invented a certain new and useful Improvement in Spring-Switches, of which the following is a full, clear, concise, and exact description, reference being had to the accompanying drawings, forming a part of this specification.

My invention relates to improvements in reversible spring throws and switch locks for tongue switches and split switches and also to spring rods for split switches, and has for its object the provision of simplifying the construction thereof so that the parts can be readily taken out and replaced when necessary. Frequent inspection is usually necessary as these devices are generally not mounted in watertight boxes and are thus subject to the injurious influences of mud and ice. It is also necessary frequently to replace springs and the heavier the traffic the more frequent must this attention be given.

My invention further contemplates the provision of a device of the character described which shall have fewer parts, and in which the parts are of such character that they can be cast directly into the form or shape in which they are to be used, requiring very little or no machine work to fit them to occupy their allotted positions.

My invention further contemplates the provision of a device of this character in which all of the parts can be taken apart and put together without the necessity of turning a single screw. This great advantage will be apparent when it is remembered in its use for street railway work the frequent renewals are a source of much work unless speedy renewals can be effected.

My device is also of such a character that with a slight modification of the operating handle it can be used as an anti-straddling device.

My invention further provides a device of this character which is sufficiently compact so that it may be shipped, assembled and attached ready for use when received by the railroad company.

In its preferred form my invention contemplates two spring receptacles each having means for engaging the opposite ends of a spring, which spring is associated with both members. One of said members is united with the tongue of a switch and the other member is mounted for actuation by hand or automatically to maintain the spring and the movable members in either one of two alternative positions. The members are so arranged that they can be placed within the containing box or associated with the spring without loosening any screw or other holding device, each member being compact within itself and the two members together with a spring forming three parts self-contained which perform the functions allotted to devices of this character.

The members when used in the form shown are provided with wings or vanes coacting with the box to maintain the members in position. A lever may be supplied for manual operation and these parts above enumerated together with the box form all that is necessary to make an operative structure for the purpose described.

The essence of my invention is adaptable not only to spring boxes but also to spring rods all as will be apparent from the construction which I will now describe in connection with the accompanying drawings and illustrating one form which my invention may take, in which:

Figure 1 is a side elevation of my improved device associated with a tongue switch, portions thereof being shown in section; Fig. 2 is a top view thereof, the cover being removed; Fig. 3 is a longitudinal section through the center of the device; Fig. 4 is a section on lines $b$, $b$ of Fig. 3; Fig. 5 is a section on lines $a$, $a$ of Fig. 3; Fig. 6 is a sectional view on lines $c$, $c$ of Fig. 3 of the movable part of the device, the spring being indicated in dotted lines; Fig. 7 is a modified form of the actuating arrangement when my invention is applied as a switch lock, or anti-straddling device; Fig. 8 is a top view of a spring rod constructed in accordance with my invention; Fig. 9 is a sectional view on lines $d$, $d$, of Fig. 8; Fig. 10 is a sectional view on lines $e$, $e$ of Fig. 8, and: Figs. 11, 12 and 13 are sectional views similar to that of Fig. 9 setting forth modifications of the structure of Fig. 8.

Referring more particularly to Figs. 1, 2, 3, 4, and 5, I show two rails 1 and 2 and a switch tongue 3 which through the agency of the connecting rod 4 is designed to be operated by my improved spring throw or switch lock device. My improved device is mounted in a casing 5 having a hinged cover 6 provided with suitable lugs 7, 7 to provide against the displacement of said cover. An opening 8 is provided to permit water to flow out of the box. The box 5 is associated with the rails 1 and 2 and the connecting rod 4 enters this box as will be presently described and is then acted upon by the mechanism of this box to set the tongue 3 in either one of its limiting positions and to maintain it in this position normally and to return it to a position in which it has been placed when the said tongue 3 is temporarily displaced as by a car trailing through the switch, all as is well understood in the art.

My improved device for setting the tongue 3 is of the reversible character as stated so that the normal position of the tongue 3 may be either to the left or to the right as will be apparent from Fig. 1, and in its preferred embodiment my device is placed in one or the other of its limiting positions through the agency of the handle 9 which controls the crank 10. The two arms 11 and 12 of the crank are suitably held in bearings 12 and 13. The arm 11 carries an enlarged portion preferably in the form of a cylindrical part 14 which is of the right size to enter the aperture 15. When the handle is to be withdrawn, a plug 16 rectangular and of the size of the aperture 15 is removed from the aperture 15, referring to Fig. 2, and the crank handle 9 is moved to the right, referring more particularly to Fig. 4, which releases the arm 12 from the bearing 13 and permits the handle to be withdrawn. The crank 10 is designed to engage jaws 17, 17 provided upon a spring receptacle 18, which spring receptacle has abutments 19, 19 at its extremities, between which abutments a spring 20 is confined. Disks 21, 21 are interposed between the spring and the abutments. An end view of the spring receptacle will more clearly illustrate its shape and this is shown in Fig. 6 which in combination with Fig. 3 will show that the hollow interior of the spring receptacle is semi-cylindrical and forms a hollow cylindrical inclosure for the spring in connection with a second spring receptacle 22 having abutments 23, 23, two at each extremity which dovetail with the abutment 19. The spring is thus confined by both members, each member acting upon both ends of the spring and the spring is thus preferably inclosed within this receptacle. The upper spring receptacle 18 is provided with wings 24, 24, by means of which it slides between guides 25, 25 and 26, 26. The lower spring receptacle rests upon two bearings 27, 27 and slides therein by virtue of its semi-circular lower portions 28, 28, between which portions 28, 28, the said spring receptacle 22 is somewhat thinner in shape and has a rib 29 as will more clearly appear from an inspection of Fig. 6.

The operation of the device will now be apparent. The handle 9 when set in the position of Fig. 1 brings both the members 18 and 22 and the spring 20 to the left as shown in said figure and thereby places the tongue 3 adjacent to the rail 1. Now then, a car trailing through the switch between the tongue 3 and the rail 1 will move the tongue 3 to the right, thereby moving the connecting rod 4 and the spring receptacle 22 to the right against the action of the spring 20, and after the car wheels have passed, the spring restores the parts again to the position shown in Figs. 1 to 5. To reverse the switch the cover 6 is opened and the handle 9 rotated to its alternative position, approximately through an arc of 180°, whereby the members 18, 20, 22 and 4 are moved to their limiting positions to the right, under which circumstances the tongue 3 is next to the rail 2. A car trailing between the tongue 3 and the rail 2 will draw the members 4 and 22 to the left against the action of the spring 20 and after the wheels have left the spring again moves these parts to their limiting position to the right. It will be seen from this that the three elements mentioned, namely, 18, 20 and 22 perform all of the functions required of a device of this character and thus by using but three parts and having them of a dove-tailing character, no screws or nuts or any other fastening devices need be used to bring the parts together or take them apart. The parts can be cast in the form in which they are to be used without requiring any machine work. To remove the parts, I first remove the plug 16, then lift out the handle and crank, and then I move the spring receptacle 18, referring to Fig. 2, to the left sufficiently to disengage the wings 24 from the guides 26, and this spring receptacle can then be lifted right out. The spring and the disks 21 can then be removed by being merely lifted out. With equal facility the spring receptacle 22 can be removed and I accomplish this as follows: As before stated the rounded portions 28 of this spring receptacle 22 permit the same to be rotated in the bearings 27, 27. The connecting rod 4 is provided with nuts 30 and between these the fork-like extension 31 of the spring receptacle 22 extends so that the two arms 32 of this extension by engaging the sides of the nuts 30 are enabled to pull the connecting rod to the left or to the right as desired. Now, to remove this spring receptacle 22 all that is necessary is to rotate it through an arc of 180° so that the two arms 32 point downwardly, and it can then be lifted out of the box.

In order to adapt my device for use as a switch lock or anti-straddling device, I leave out the handle 9 but retain the crank 10 as shown in Fig. 7, and insert a small plug 33. This limits the movement of the crank so that it is in an angular position sufficiently elevated from the horizontal so that a sufficient pressure against the tongue 3, as for instance when an operator is trying to change the direction of a facing switch, will permit a reversal of the parts and the spring thereupon will place the parts absolutely in their alternative position so that the parts can not remain in an intermediate position. This locks the tongue to either one side or the other. The cover 6 is cut out at 34 to accommodate the crank when operating under said conditions. In that event, of course, no hinged cover is necessary and a fixed cover may be employed, and the casing may then be made water tight.

When my invention is applied to spring rods, the illustration of Figs. 8, 9, and 10 will set forth the construction. In these I have two exactly similar members 35 and 36 which are provided with abutments 19 and 23 respectively, which members dovetail into each other so that at one side the abutment 19 projects downwardly and at the other end of the spring rod the abutment 19 points upwardly, all as will be apparent from the illustration. The spring 20 is arranged between the parts as shown and the three parts mentioned serve the same purpose and give the same results as the corresponding parts of the spring box. In Fig. 11 the parts are shown of an interlocking character having projecting arms 37 for this purpose. In Fig. 13 the parts instead of being provided with enlarged holding portions are held together within a ring 38. In Fig. 12 the two parts 35 and 36 are clamped together by means of the blots 39 and the semi-circular member 40. To facilitate removal of the member 18, I provide a tongue 41 against which a suitable lever may be placed and cooperating with the edge of the casing 5 serve to force this member 18 to the left to disengage it from the portions 26, 26. Without providing such a projection, it might be difficult to properly engage this member as the device with which the member would have to be forced to the left, would, if necessary, have to enter the space between the abutments 22 and 23.

While I have herein shown and particularly described the preferred form of my invention, I do not mean to limit myself to the precise construction and arrangement as herein set forth, but

Having thus described the preferred form of my invention, what I claim as new and desire to secure by Letters Patent is:

1. In a device of the character described the combination with a spring receptacle, means for associating same to a switch member, a second spring receptacle, and a spring for said receptacles, said receptacles having dove-tailing abutments for said spring.

2. In a device of the character described the combination with a spring receptacle, means for associating same to a switch member, a second spring receptacle, a spring for said receptacles, said receptacles having dove-tailing abutments for said spring, and means for maintaining said receptacles in coöperative relation.

3. A spring box for switches having a spring and spring members, a crank associated with one of said members and removably mounted in said box, and bearings integral with said box within which said crank is mounted.

4. A spring box for switches having a spring and spring members, and a crank associated with one of said members and removably mounted in said box, said box having integral bearings for said crank, and removable means to hold said crank in said bearings.

5. A spring box for switches having a spring and spring members, and a crank associated with one of said members and removably mounted in said box, said box having bearings for said crank, and a distance piece to hold said crank in said bearings.

6. A device of the character described having a spring, two spring members, a connecting rod, and means for associating one of said members with said rod to permit disengagement of said member and rod upon rotation of said member.

7. In a device of the character described the combination with a spring member, means for associating same to a switch member, a second spring member, and a spring for said members, said members having dove-tailing abutments for said spring.

8. In a device of the character described the combination with a spring member, means for associating same to a switch member, a second spring member, a spring for said members, said members having dove-tailing abutments for said spring, and a crank for controlling one of said members.

9. In a device of the character described the combination with a spring member, means for associating same to a switch member, a second spring member, a spring for said members, said members having dove-tailing abutments for said spring, a crank for controlling one of said members, and means for maintaining said crank in its limiting positions in a position inclined to the direction of motion of said members.

10. In a device of the character described the combination with a spring member, means for associating same to a switch member, a second spring member, a spring for said members, said members having dove-tailing abutments for said spring, a crank for controlling one of said members, and a handle for said crank.

11. A device of the character described having a spring member, a spring, a second spring member, and means for rotatably and slidably mounting said second member.

12. In a device of the character described, a box, two spring members, a spring, and means for independently slidably mounting both of said members in said box.

13. In a device of the character described, a box, two spring members, a spring, and means for independently slidably mounting both of said members in said box, said means permitting withdrawal of one of said members from said box when said member has been slidably moved beyond its normal stroke.

14. A device of the character described having a spring, two spring members, a connecting rod, and means for associating one of said members with said rod to permit sliding engagement and disengagement of said member from said rod.

15. A device of the character described comprising two spring members with dovetailing abutments at each end, a spring interposed between said abutments and means for maintaining said members in coöperative relation.

16. A spring throwing device for railway switches consisting of two members, a spring inclosed by said members, each member having an abutment at or near each end between which said spring is placed, and means for maintaining said members in coöperative relation.

17. A device of the character described comprising two semi-tubular spring members, each member having an abutment at or near each end between which a spring is interposed and means for maintaining said members in coöperative relation.

18. A double acting spring throw device for railway switches consisting of a spring, a plurality of abutments for confining said spring, two members exteriorly of said spring to which abutments are secured, and means for maintaining said members in coöperative relation.

19. A double acting spring throw device for railway switches consisting of a spring, two members exteriorly of said spring, each member having an abutment at each end between which said spring is placed, and means for maintaining said members in coöperative relation.

In witness whereof, I hereunto subscribe my name this fifth day of October A. D., 1910.

THOMAS A. GERLACH.

Witnesses:
A. LYDA JONES,
HAZEL JONES.